United States Patent [19]

Twardawa et al.

[11] Patent Number: 4,619,424
[45] Date of Patent: Oct. 28, 1986

[54] TENSION LINK FOR PARACHUTE/PAYLOAD SEPARATION

[75] Inventors: Philip A. Twardawa, Shannon; Michel C. St-Onge, Neufchatel, both of Canada

[73] Assignee: Her Majesty the Queen in right of Canada, Canada

[21] Appl. No.: 688,897

[22] Filed: Jan. 4, 1985

[30] Foreign Application Priority Data

Feb. 15, 1984 [CA] Canada .................................. 447502

[51] Int. Cl.⁴ ............................................. B64D 17/38
[52] U.S. Cl. ............................... 244/151 B; 294/82.25; 294/82.28
[58] Field of Search ........................... 244/150, 151 B; 24/115 L; 294/82.25, 82.28

[56] References Cited

U.S. PATENT DOCUMENTS

| | | | |
|---|---|---|---|
| 2,502,097 | 3/1950 | Linder | 244/151 B |
| 2,562,459 | 7/1951 | Hoey | 294/82.28 |
| 2,880,687 | 4/1959 | Kilvert | 244/151 B |
| 3,829,146 | 8/1974 | Laswell et al. | 294/82.25 |

FOREIGN PATENT DOCUMENTS

| | | | |
|---|---|---|---|
| 594006 | 3/1960 | Canada | 244/151 B |
| 695345 | 8/1953 | United Kingdom | 244/151 B |
| 867419 | 5/1961 | United Kingdom | 244/151 B |
| 2119844 | 11/1983 | United Kingdom | 244/151 B |

Primary Examiner—Trygve M. Blix
Assistant Examiner—Rodney Corl
Attorney, Agent, or Firm—Stevens, Davis, Miller & Mosher

[57] ABSTRACT

A mechanical device is provided to link a payload and a parachute together prior to and during parachute dropping of the payload and provide for automatic separation of the payload from the parachute after the payload and parachute have landed. The payload is secured to either a shaft or housing of the device, and the parachute is secured to the other. The forces acting on the device during parachute dropping of the payload arm a mechanical system for releasably dis-associating the shaft and the housing, and when the payload has landed, the different forces prevalent on the system cause mechanical releasing of the shaft and housing. The device according to the present invention provides a novel method of parachute/payload separation and avoids the use of, and problems inherent with the use of, detonators which have been previously used for such purposes.

15 Claims, 8 Drawing Figures

TENSION LINK FOR PARACHUTE/PAYLOAD SEPARATION

BACKGROUND OF THE INVENTION

The present invention relates to a mechanical device to link a payload and a parachute together prior to and during the parachute dropping of the payload, and to effect automatic separation of the payload from the parachute after the payload and parachute have landed in a target area, particularly on water.

Pyrotechnic marine markers and sonobuoys are used by armed forces and civilian organizations for a variety of purpose such as reference marking, signalling, wind-drift indicating, tracking in anti-submarine warfare, search and rescue operations and paratroop and airdrop operations. Because of the nature of these operations, it is imperative that the marking devices perform reliably and effectively.

A controlling factor in marker design and in their operation while floating on water is the effect of impact they receive upon landing. As they can be deployed from a variety of delivery flight envelopes, with altitudes ranging from 0-3000 m and release speeds ranging from hover to 300 knots, severe damage can result if a poor (i.e. violent) impact with water is made. To ensure a correct landing attitude for all possible delivery modes, it is desirable to equip the marker with a parachute or even more simply a drag-chute or dragribbon. While not all of these latter will substantially reduce the rate of descent of a marker, they all serve the purpose of orientating the marker correctly so that it makes a streamlined entry into the water with no resultant damage. Once on the water's surface, however, a complication arises in that the parachute (hereafter "parachute" will be intended also to include drag-chutes and drag-ribbons) will be carried by the waves and will tend to pull at the marker during its functioning. This dragging action will periodically submerge or swamp the marker, severely limiting its performance.

Clearly a method of separating the payload (i.e. marker) from its parachute immediately upon touchdown is required. The problem is not restricted solely to the deployment of signalling markers as described above. Other manoeuvres, such as air or ground towing and the slinging of loads from helicopters, have requirements for the automatic separation of a tow line from a payload.

There have been relatively few methods or devices developed to solve the problem of parachute/payload separation. Perhaps the most widely used method today relates to the use of "cable cutters". These consist of small explosive charges, usually in the form of detonators that are fired electrically to either directly sever a cable or cause a sharp cutting object to impact against and rupture the cable.

Alternatively, different types of tension links have been developed for parachute release which are either electrically or electronically activated. Almost exclusively, however, automatic parachute/payload separation has been carried out to the present by means of devices containing explosive cable cutters, electronic timing circuits, electronic remote control circuits or salt-water battery circuits.

While such devices may work reliably and be advantageous for certain fields of application, they do possess drawbacks that could limit their use in other areas. Of foremost importance is the explosive contained in the cable cutters. The presence of explosive material imposes limitations or at a minimum necessitates specific procedures for the storage, handling and use of the entire device. In certain circumstances this may unduly complicate the comparative ease with which the device could otherwise be employed.

Both the cable cutter and the electrically activated tension link require reliable and failsafe firing circuits, with the needed electrical energy to be provided either by adequate self-contained batteries or by external sources. If the circuit is designed to be fired automatically, it must do so only after a well-defined event or series of events or time lapse. Remote firing requires that the circuit be adequately shielded from stray triggering pulses. In either case, and with manual firing, the circuit may be required to remain serviceable after extended periods of storage or upon storage under arduous environmental conditions.

Depending on the type of payload in question, such a system may be both complicated and costly. For marine markers where the tension link must be self-activating and "disposable", a low cost is essentially a prerequisite. The costs involved in a reliable electrical firing circuit or with explosive cutters makes their use rather unattractive with relatively small, low-cost payloads.

Thus, it is an object of the present invention to provide a mechanical tension link which is designed primarily to carry out automatic separation of a payload from its parachute following touchdown without the use of explosive charges or electrical or electronic activation devices. It is a related object of the present invention to provide a tension link consisting uniquely of mechanical components and which is self-activating to separate the payload from its parachute on touchdown, requiring no external human, explosive or electronic impetus to bring about its function.

SUMMARY OF THE INVENTION

According to the presention invention there is provided such a mechanical tension link device which comprises a housing to which either the parachute or payload is to be secured and an elongated shaft movable within the housing in direction of the longitudinal axis of the shaft. One end of the shaft extends from the housing, to which end the other of the parachute or payload is to be secured. The shaft is movable with respect to the housing between armed position in one direction and uncoupling position in the other. A retainer means provided to be releasably secured to the other end of the shaft so that when it is secured thereto movement of the retainer means and shaft is physically constrained by the housing from going beyond armed position in said one direction. The device further comprises first biasing means to apply a force against the housing and the retainer means when the latter is secured to the shaft, the force tending to urge the shaft and retainer means towards uncoupling position. The force applied by the first biasing means is less than the force which would normally exist urging the shaft towards armed position during the parachute dropping of the payload. A locking means is also provided to be associated with the shaft and housing and releasably secure the shaft, with respect to the housing, in a fixed, intermediate, unarmed position. The locking means when in position is releasable only when a force exceeding a predetermined magnitude is applied to the shaft in said one direction, which force overcomes the force of the first biasing means in the other. The device further comprises another locking means to be associated with the shaft and retainer means and secure the retainer means to the shaft when the shaft is in unarmed position or armed position, but to release the retainer means from the shaft when the shaft is in uncoupling position. Once the retainer means is thus released, the shaft is free to be extracted from the housing, thereby resulting in separation of the payload from the parachute.

As will be described in more detail hereinafter, the device is armed at parachute deployment during descent of the payload, and functions or "falls apart" mechanically at the time of payload touchdown in the target area (e.g. on the surface of water). The payload is thereafter liberated from its parachute. As will be appreciated, since the device requires no electronic or explosive elements, it is relatively inexpensive to construct and remains safe while in storage. The device is safer to operate and avoids many of the problems inherent with devices requiring explosive actuation. The device according to the present invention further provides a significant degree of reliability.

BRIEF DESCRIPTION OF THE DRAWINGS

These and other advantages of the invention will become apparent upon reading the following detailed description and upon referring to the drawings in which.

Figure 1:
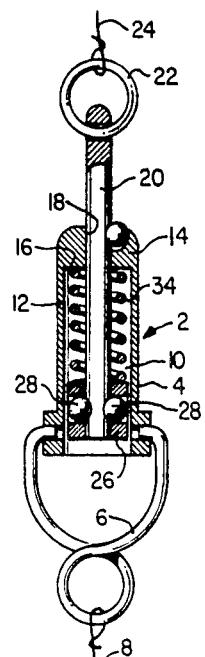
FIGS. 1 to 4 are section views of an example embodiment of the mechanical tension link according to the present invention in various stages of operation, this embodiment being characterized by a releasable arming bearing mechanism.

While the invention will be described in connection with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description similar features have been given similar reference numerals.

Turning to FIGS. 1 to 4, there is illustrated a mechanical tension link device 2 according to the present invention, the device being illustrated in various stages of operation as will be described in more detail hereinafter. In FIG. 1, the device is depicted in the unarmed stage, as can be found prior to deployment. The device comprises a housing 4 to which is secured a clip 6 to which a payload is secured by securing means 8. In the embodiment illustrated, the housing is cylindrical in overall shape, and has an interior cylindrical chamber 10, open at its bottom end and having side walls 12. Upper end 14 of housing 4 is closed providing an interior upper wall 16 for interior chamber 10.

In housing upper end 14 is an aperture 18 through which shaft 20 is slidably positioned for movement along the shaft's longitudinal axis. The upper, free end of shaft 20 extends upwardly from the housing. To it is attached a clip 22 to which a parachute is secured by way of securing means 24. It should be noted at this point that the device will work equally well when in the illustrated orientation or when rotated 180°, i.e. the parachute securing means 24 being secured to clip 6 and housing 4 rather than to clip 22 and shaft 20.

At the bottom end of shaft 20 is releasably secured a retainer means 26. The purpose of retainer means 26 is to restrict movement of the shaft, in the upwards direction as depicted in FIG. 1, beyond a certain point and thereby prevent the shaft from being pulled, in the upwards direction, completely out of housing 4. Retainer means 26 comprises a cylindrical body which is releasably secured to the bottom portion of shaft 20 by means of locking bearings 28. When the shaft of the mechanical tension link is in unarmed position (FIG. 1) or armed position (FIG. 2), bearings 28 are seated in aligned depressions 30 in shaft 20 and apertures 32 through retainer means 26, and prevented from leaving that seated position by interior chamber walls 12. It will be clear from FIGS. 1 and 2 that, while the locking bearings 28 are thus seated, relative movement between retainer means 26 and shaft 20, and the disengagement of retainer means 26 from its seated position on the bottom of shaft 20 is not possible. On the other hand, when shaft 20 moves downwardly towards uncoupling position, illustrated in FIG. 3, so that apertures 32 are clear of side walls 12 of chamber 10, locking bearings 28 are no longer restrained in seated position in apertures 32 and depressions 30 in shaft 20. As they fall out of apertures 32, shaft 20 is then free to slide out of retaining means 26.

Figure 2:
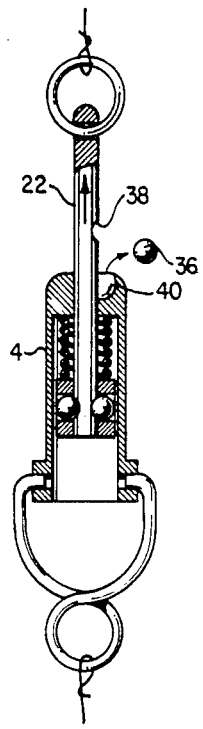
Figure 3:
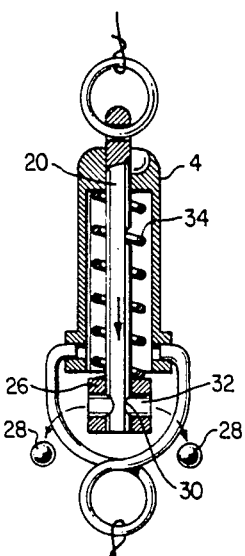
Figure 4:
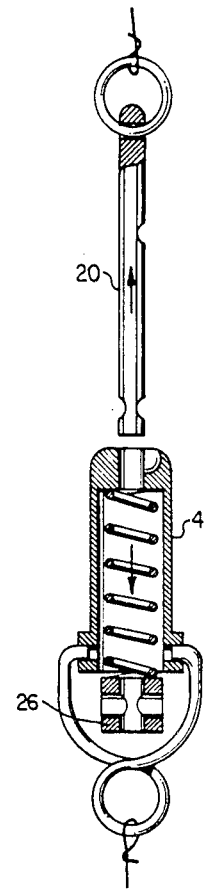

Circumscribing shaft 20, and seated within chamber 10 of housing 4, is a biasing means consisting of spring 34. In those positions spring 34 is held under compression, with its upper end abutting against upper wall 16 of chamber 10 and its lower end abutting against the upper end of retainer means 26. This spring applies a force against the interior upper wall 16 of upper end 14 of housing 4, and against retaining means 26 while the latter is secured to the shaft, which force tends to urge shaft 20 and retainer means 26 towards uncoupling position (FIG. 3). In fact this force as applied by the biasing means is less than the force which normally exists to urge the shaft towards armed position (FIG. 2) during the parachute dropping of the payload, so that during the dropping of the payload the device can achieve the configuration illustrated in FIG. 2.

Shaft 20 is secured in unarmed position (FIG. 1) with respect to housing 4 by means of arming bearing 36 which is seated in depression 38 (FIG. 2) in shaft 20 and depression or receptacle 40 in the upper end 14 of housing 4 (FIG. 2) when the two depressions are coincident as illustrated in FIG. 1. These depressions are positioned and formed so as to secure shaft 20 in unarmed position (as illustrated in FIG. 1), against movement longitudinally in the downward direction, with respect to housing 4, when these depressions are aligned and arming bearing 36 is seated in the depressions as illustrated in FIG. 1. (Spring 36 of course "discourages" longitudinal movement of the shaft 20, when in unarmed position, against movement longitudinally in the upward direction.) Similarly, the positioning and construction of the depressions is such as to cause arming bearing 36 to be released when a predetermined minimum threshold of force is applied in an upward direction to shaft 20 as illustrated (see FIG. 2), thereby enabling shaft 20 to move upwardly into armed position and then downwardly (FIG. 3) to uncoupling position. It will be noted from FIG. 2 that, to facilitate this operation of release of bearing 36, depression or socket 40 in housing 4 is larger and receives a greater portion of arming bearing 36 when seated therein than depression 38 in shaft 20.

The operation of the device is as follows. In FIG. 1 it is depicted in the unarmed state, as to be found, for example, in a marine marker/parachute payload prior to deployment. Spring 34 is compressed somewhat so that arming bearing 36 is held in place under tension. In this manner the device remains safe and relatively secure from disengagement of its parts if subjected to shock or vibration. In FIG. 2, parachute/payload deployment has taken place and shaft 20 has been pulled up with respect to housing 4, releasing arming bearing 36 and fully compressing spring 34. Once equilibrium is achieved during descent of the payload/parachute, the weight of the payload will equal the tension in the riser cable (securing means 24) provided by the parachute. Since that tension is substantially greater than the spring force at maximum compression, the mechanism will normally remain in this configuration of FIG. 2 during the remaining descent of the payload.

FIG. 3 illustrates the movement of the parts of the device when the payload has touched down on the water's surface and is floating. As a result, the tension in the parachute riser cable (securing means 24) drops to zero and the spring 34 is able to move retainer means 26 and shaft 20 downwardly so that apertures 32 in the retainer means clear the housing, enabling locking bearings 28 to fall away. Should the parachute be carried by the waves and tug at shaft 20, the latter will slide freely out of the housing (FIG. 4) and separation of the payload from its parachute is completed.

It should be noted that the mechanical tension link device according to the present invention may be made of standard materials. For example, and not to limit the scope of the present invention, shaft 20 may be a drill rod, for example of 0.250 inch diameter; spring 34 may be made from music wire spring steel for example of 0.048 inch diameter; the retainer may be made from brass; the housing may be made from aluminum (65S-T6) or steel (1010/1020), locking bearings 28 and arming bearing 36 may be made from steel, and for example be of 0.250 inch diameter. A standard payload weight which might be expected for use with a link built using such materials might for example be 15 to 20 pounds. A link which could carry much heavier weights might of course be constructed according to this invention using appropriate materials.

Figure 5:
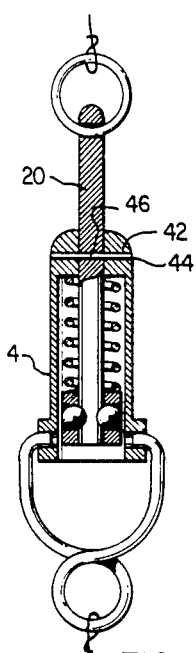
FIGS. 5, 6, 7 and 8 respectively illustrate section views of alternative example embodiments of the mechanical tension link according to the present invention, all being illustrated in unarmed position.

FIGS. 5 to 8 illustrate alternative embodiments of the device according to the present invention. In the embodiment illustrated in FIG. 5, a shear pin 42 passing through aligned apertures 44 (through the upper end 14 of housing 4) and 46 (through shaft 20) is used to secure shaft 20 in unarmed position in place of arming bearing 36 seated in depressions 38 and 40. Although the tension of spring 34 is sufficient to hold the shaft in unarmed position, in the embodiment of the device illustrated in FIGS. 1 to 4, this tension is relatively small and for some applications may be insufficient, for example if extreme shock or vibrations are likely to be encountered during storage or prior to actual use of the device. In such a case an embodiment of the invention having a shear pin 42 as illustrated in FIG. 5 may be used. The shear pin may be fabricated from aluminum, steel, plastic or other material. It can be engineered to be of a strength to resist the vibrations and shocks of storage and hold the shaft in unarmed position with respect to the housing, but to yield to the extreme shock (i.e. greater forces exerted in the upwards direction) introduced at the time of parachute deployment so as to arm the device as before. If a greater degree of security is required during storage, for instance because of excessive vibrations, a larger second shear pin or safety pin (not illustrated) could also be installed and would be manually removed prior to deployment.

Figure 6:
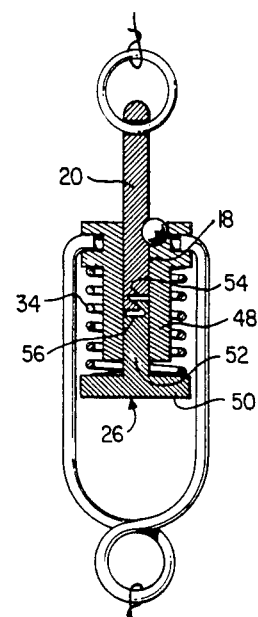

In FIG. 6 there is illustrated yet a further embodiment of the device according to the present invention in which a housing 48 is provided of different shape than housing 4 of the preceding embodiment, this housing not having a chamber 10, but instead being provided with an aperture 18 of uniform shape and size passing through its length, from top to bottom. Retainer means 26 is provided with a base 50 and a neck 52 normal thereto, the neck fitting flushly into aperture 18 for sliding movement therein. The lower end of shaft 20 and the upper end of neck 52 are contoured respectively at 54 and 56, for example with an "S"-shape, to interlock while these ends are confined within aperture 18. Upward movement of the shaft 20 is restricted by retainer means base 50 abutting against the bottom surface of housing 48. When shaft 20 moves downwardly in aperture 18 under urging of spring 34, so that the interlocking surfaces 54 and 56 of shaft 20 and neck 52 are outside of aperture 18, below housing 48, it will be understood that these surfaces are then freed to disengage, thereby freeing shaft 20 to be removed from housing 48 in the upwards direction. Otherwise, the principle of operation is similar to that of the embodiment illustrated in FIGS. 1 to 4. Alternatively, the construction of FIG. 6 can include the modification of FIG. 5 (i.e. shear pin to replace arming bearing), or the modification of FIG. 7 and or FIG. 8 (to be described hereinafter).

Figure 7:
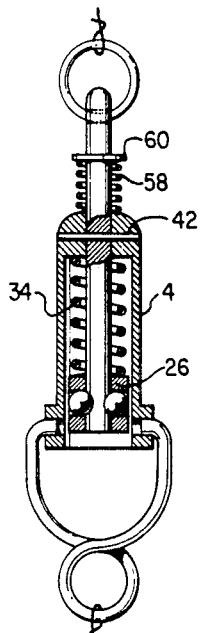

In FIG. 7, the embodiment of FIG. 5 has been modified by the provision of a secondary biasing means in the form of spring 58 which provides a force pushing against the upper end 14 of housing 4 and a lip or washer 60 secured to an upper portion of shaft 20. In this embodiment, shaft 20 is double-spring loaded, with spring 34 serving to push against retainer means 26 as in the embodiment of FIGS. 1 to 4, but weaker spring 58 taking over, when retainer means 26 has become freed from engagement on shaft 20, to force shaft 20 upwardly out of housing 4. In this embodiment, shaft 20 does not have to rely on a tug from the parachute to be removed from housing 4, as in the case of the previously illustrated embodiments.

Figure 8:
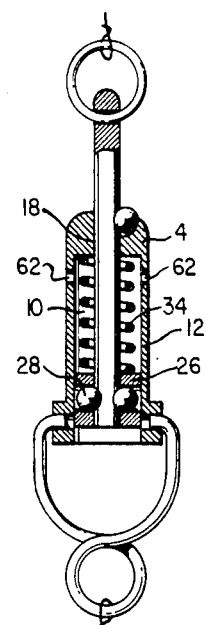

In yet a further embodiment of the mechanical tension link device according to the present invention, FIG. 8 illustrates a device which is essentially similar to that of FIGS. 1 to 4 but in which machining tolerances of the parts have been tightened in order that a closer sliding fit is obtained between the contact surfaces of retainer means 26 and the cylindrical interior chamber walls 12, between the outside walls of shaft 20 and the interior walls of aperture 18 and between the shaft 20 and retainer means 26. In this manner, chamber 10, inside housing 4, will momentarily show a pressure differential with respect to the ambient pressure outside that chamber, should any rapid movement of shaft 20 take place. A positive pressure will result during parachute deployment as shaft 20 is being forced upwardly; the entrapped air will gradually leak past the sliding surfaces (and, where provided as illustrated, through bleed holes 62) and allow shaft 20 to compress the spring 34 as previously described and illustrated herein. At payload touchdown, when tension on the shaft 20 is released and spring 34 takes over to push shaft 20 back down, the negative pressure in the chamber 10 will tend to retard the movement of shaft 20. The rate of movement will be a function of the force of spring 34, friction, and the leakage of air passed by the sliding surfaces and/or through bleed holes 62. While the course of shaft 20 is in no way altered in this embodiment from that illustrated in FIGS. 1 to 4, its slower movement will require a longer period of time for locking bearings 28 to clear the inner chamber walls 12 before they fall away.

This feature will find application under certain deployment conditions for specific payload/parachute configurations. Following payload ejection from an aircraft, parachute deployment will snap or jerk at the payload and arm device 2. Tension in riser cable (24) however could thereafter momentarily drop to zero if the payload rebounds during descent, i.e. if the payload rebounds after initial snap or jerk at parachute deployment. Should this occur, there could be enough time for spring 34 to push shaft 20 to uncoupling position (FIG. 4) and thereby cause the mechanism to uncouple. In the embodiment of FIG. 8 however the damping action of the pressurized chamber 10 will reduce the liklihood of such rapid disengagement which might otherwise take place during parachute deployment. For example, for large parachutes which are matched to their payloads to provide for slow descent, rebounding of the payload might well occur during descent and the use of the embodiment illustrated in FIG. 8 might well be advisable.

While the primary application of the device according to the present invention is with parachute equipped marine markers, the invention is not intended to be restricted solely to this area. Clearly larger payloads that are air-dropped to remote locations might use the device according to the present invention to advantage. (The device however is not recommended for use with human payloads because of the omnipresent danger of unwanted separation.) Other manoeuvres where separation of two components is required following relaxation of an applied tensile force may make use of such a device. For example, the automatic release of helicopter-slung loads following their placement of the surface, or of ground vehicles or aircraft in tow, could make use of devices according to the present invention.

While the drawings illustrate different constructions of mechanical tension links according to the present invention, there of course exists a wide variety of designs that use the same principles of operation, and it is not intended to limit the present invention to the illustrated embodiments. The device according to the present invention provides a safe, unarmed configuration during storage and/or prior to deployment, automatic arming of the mechanism during parachute deployment and payload descent, mechanical separation of the device upon touchdown and completion of payload/parachute separation. The device according to the present invention is relatively economical to construct and reliable in operation.

Thus there has been provided in accordance with the present invention a link for mechanical separation of parachute/payload that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed:

1. A mechanical device to link a payload and a parachute together prior to and during the parachute dropping of the payload, and to effect automatic separation of the payload from the parachute after the payload and the parachute have landed, the device comprising:
   (a) a housing to which either the parachute or payload is to be secured;
   (b) an elongated shaft movable within the housing in the direction of the longitudinal axis of the shaft, one end of the shaft extending from the housing to which end the other of the parachute or payload is to be secured, the shaft being movable with respect to the housing between an armed position in one direction and an uncoupling position in the other;
   (c) retainer means releasably secured to the other end of the shaft so that movement of the retainer means and shaft is physically constrained by the housing from going beyond the armed position in said one direction;
   (d) first biasing means to apply an uncoupling force against the housing and the retainer means to urge the shaft and retainer means towards the uncoupling position, the uncoupling force being less than the force which would normally exist urging the shaft towards the armed position during the parachute dropping of the payload;
   (e) first locking means directly engaged with the shaft and the housing and releasably securing the shaft to the housing, in a fixed, intermediate, unarmed position, the first locking means adapated to be released in response to the application of an unlocking force of predetermined magnitude to the shaft in said one direction, the magnitude of the unlocking force being greater than the uncoupling force of the first biasing means in the other; and
   (f) second locking means associated with the shaft and retainer means and securing the retainer means to the shaft when the shaft is in unarmed position and armed position but releasing the retainer means from the shaft when the shaft is in uncoupling position, the retainer means when thus released freeing the shaft to be extracted from the housing, thereby resulting in separation of the payload from the parachute.

2. A device according to claim 1 wherein the first biasing means comprises a coil spring circumscribing the shaft, one end of which spring abuts against the housing and the other against the retainer means, the spring being under compression when the shaft is in unarmed position and armed position.

3. A device according to claim 1 wherein the housing is provided with an internal chamber, one end of which is closed and has an aperture through which the shaft slideably fits, and the other end of which is open, the chamber circumscribing the first biasing means and retainer means when the retainer means is secured to the shaft and the shaft is in armed and unarmed position.

4. A device according to claim 3 wherein the interior wall of the housing is cylindrical and wherein the retainer means is of annular shape and circumscribes the side wall of the shaft near the end of the shaft between the shaft and the walls of the housing when it is in position secured to the shaft.

5. A device according to claim 4 wherein the side wall of the shaft circumscribed by the retainer means is provided with a depression and the side wall of the retainer means is provided with apertures laterally aligned with such depressions, and wherein the second locking means associated with the shaft and retainer means to releasably secure the retainer means to the shaft comprises ball bearings releasably seatable in the depressions of the shaft and apertures of the retainer means, the bearings being prevented from disengagement from such seated position by the interior wall of the housing, when the shaft is in armed and unarmed position, the apertures of the retainer means being located so as to be clear of the inner wall of the housing when the shaft has moved to uncoupling position, so that in that uncoupling position the bearings are free to become displaced from such seated position in the depressions and retainer means apertures to free the retainer means from secured engagment with the shaft.

6. A device according to claim 1 wherein the housing is elongated and provided with a central passageway through which the shaft is flushly fitted for sliding movement, the retainer means consisting of a base portion and a neck portion extending normal thereto and terminating at a free end, the free end of which is provided with a releasable first locking portion to releasably secure the neck of the retainer means to a cooperating second locking portion provided at said other end of the shaft, the neck portion of the retainer means extending into the passageway of the housing when the shaft is in armed and unarmed positions, the interior walls of the passageway preventing the first and second locking portions of the neck portion of the retainer means and of the shaft from releasing, said other end of the shaft and the end of the neck portion on which the first and second locking portions are located being clear of the passageway of the housing when the shaft is in uncoupling position, the first and second locking portions freeing the shaft and neck portion of the retainer means from engagement when in uncoupling position.

7. A device according to claim 6 wherein the first and second locking portion comprises interlocking, "S"-shaped confronting surfaces of co-operating ends of the shaft and neck portion of the retaining means, and wherein the neck portion is of a crosssectional size and shape similar to that of the shaft so that the interior walls of the passageway keeps these confronting surfaces in engagement while the co-operating ends of the shaft and neck portion are within the passageway.

8. A device according to claim 6 wherein the first biasing means comprises a coil spring circumscribing the shaft and a portion of the housing, the spring bearing against confronting portions of the housing and base of the retainer means and being under compression when the shaft is in unarmed position and armed position.

9. A device according to claim 1 wherein the first directly engaged with the shaft and housing comprises a shear pin to pass through aligned, transverse apertures in the housing and a portion of the shaft within the housing, the apertures being aligned when the shaft is in unarmed position with respect to the housing, the shear pin being of a strength to hold the shaft in unarmed position with respect to the housing against the force of the first biasing means and breaking when a force exceeding a predetermined magnitude is applied to the shaft in said one direction, which force overcomes the force of the first biasing means in the other.

10. A device according to claim 1 wherein a second biasing means is provided applying a force on the shaft tending to urge the shaft towards armed position, the second biasing means applying a force less than that of the first biasing means, the force of the second biasing means being sufficient to move the shaft clear of the housing when the retainer means has become released from its engagement on the shaft.

11. A device according to claim 3 wherein the shaft and the housing at its closed end are provided with apertures alignable when the shaft is in unarmed position with respect to the housing, and wherein the first locking means comprises a shear pin to be seated in those apertures when aligned, the pin being of a strength to hold the shaft in unarmed position with respect to the housing against the force of the first biasing means and breaking when a force exceeding a predetermined magnitude is applied to the shaft in the arming direction, which force overcomes the force of the first biasing means in the other.

12. A device according to claim 4 wherein the retainer shaft within the aperture and the retainer means in the shaft and within the chamber when the retainer means is secured on the shaft are constructed of a size for close sliding fit to create a temporary pressure differential within the chamber with respect to ambient pressure outside the device should rapid movement of the shaft with retainer means secured thereon take place, thereby providing a damping action on the movement of the shaft of the device.

13. A device according to claim 12 wherein the walls of the chamber are provided with one or more bleed holes to assist in equalization of the pressure within the chamber with the ambient pressure when rapid movement of the shaft with retainer means secured thereon has taken place.

14. A mechanical device to link a payload and a parachute together prior to and during the parachute dropping of the payload, and to effect automatic separation of the payload from the parachute after the payload and the parachute have landed, the device comprising:
 (a) a housing to which either the parachute or payload is to be secured, the housing including an internal chamber with a closed end having an aperture therethrough and an open end;
 (b) an elongated shaft movable within the housing in the direction of the longitudinal axis of the shaft, one end of the shaft extending from the housing through the aperture in the closed end to which end the other of the parachute or payload is to be secured, the shaft being movable with respect to the housing between armed position in one direction and uncoupling position in the other;
 (c) retainer means to be releasably secured to the other end of the shaft within the internal chamber of the housing so that when it is secured thereto movement of the retainer means and shaft is physically constrained by the housing from going beyond armed position in said one direction;
 (d) first biasing means circumscribed by the internal chamber of the housing to apply a force against the housing and the retainer means when the latter is secured to the shaft, tending to urge the shaft and retainer means towards uncoupling position, the force applied by the first biasing means being less than the force which would normally exist urging the shaft towards armed position during the parachute dropping of the payload;

(e) first locking means comprising depressions formed in the side wall of the shaft and in the exterior surface of the closed end of the housing, these depressions cooperating when the shaft is in unarmed position with respect to the housing to releasably receive a ball bearing, the ball bearing when so releasably received by the depressions in the shaft and housing securing the shaft and housing in that unarmed position and preventing movement of the shaft beyond that position towards uncoupling position, but the ball bearing being released from secured position in the depressions when the shaft is moved from that unarmed position towards arming position, thereby freeing the shaft to move in either direction subject to the forces exerted upon it; and (f) second locking means to be associated with the shaft and retainer means and secure the retainer means to the shaft when the shaft is in unarmed position and armed position but to release the retainer means from the shaft when the shaft is in uncoupling position, the retainer means when thus released freeing the shaft to be extracted from the housing, thereby resulting in separation of the payload from the parachute.

15. A mechanical device to link a payload and a parachute together prior to and during the parachute dropping of the payload, and to effect automatic separation of the payload from the parachute after the payload and the parachute have landed, the device comprising:

(a) a housing to which either the parachute or payload is to be secured;

(b) an elongated shaft movable within the housing in the direction of the longitudinal axis of the shaft, one end of the shaft extending from the housing to which end the other of the parachute or payload is to be secured, the shaft being movable with respect to the housing between armed position in one direction and uncoupling position in the other;

(c) retainer means to be releasably secured to the other end of the shaft so that when it is secured thereto movement of the retainer means and shaft is physically constrained by the housing from going beyond armed position in said one direction;

(d) first biasing means to apply a force against the housing and the retainer means when the latter is secured to the shaft, tending to urge the shaft and retainer means towards uncoupling position, the force applied by the first biasing means being less than the force which would normally exist urging the shaft towards armed position during the parachute dropping of the payload;

(e) first locking means to be associated with the shaft and housing and releasably secure the shaft, with respect to the housing, in a fixed, intermediate, unarmed position, the first locking means when in position releasable only when a force of predetermined magnitude is applied to the shaft in said one direction, which force overcomes the force of the first biasing means in the other;

(f) second locking means to be associated with the shaft and retainer means and secure the retainer means to the shaft when the shaft is in unarmed position and armed position but to release the retainer means from the shaft when the shaft is in uncoupling position, the retainer means when thus released freeing the shaft to be extracted from the housing, thereby resulting in separation of the payload from the parachute; and (g) a second biasing means comprising a coil spring circumscribing the shaft and seated under compression when the shaft is in unarmed position and uncoupling position with one end bearing against a lip means secured to a portion of the shaft extending from the housing when the shaft is in those positions and the other end bearing against a portion of the housing, the second biasing means applying a force on the shaft tending to urge the shaft towards armed position, the second biasing means applying a force less than that of the first biasing means, the force of the second biasing means being sufficient to move the shaft clear of the housing when the retainer means has become released from its engagement on the shaft.

* * * * *